US008018481B2

(12) United States Patent
Shao et al.

(10) Patent No.: US 8,018,481 B2
(45) Date of Patent: Sep. 13, 2011

(54) CONFERENCING SYSTEM AND METHOD FOR EXCHANGING SITE NAMES (CALLER ID) IN LANGUAGES BASED ON DOUBLE OR MULTIPLE BYTE CHARACTER SETS

(75) Inventors: Junqing Shao, Round Rock, TX (US); Alain Nimri, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1464 days.

(21) Appl. No.: 11/456,465

(22) Filed: Jul. 10, 2006

(65) Prior Publication Data
US 2007/0041540 A1    Feb. 22, 2007

Related U.S. Application Data

(60) Provisional application No. 60/698,693, filed on Jul. 13, 2005.

(51) Int. Cl.
*H04N 7/14* (2006.01)
(52) U.S. Cl. .......... 348/14.01; 379/142.04; 455/415
(58) Field of Classification Search ............ 348/14.08; 379/142.01
See application file for complete search history.

(56) References Cited

U.S. PATENT DOCUMENTS

| | | | |
|---|---|---|---|
| 5,701,497 A | 12/1997 | Yamauchi et al. | |
| 6,134,223 A * | 10/2000 | Burke et al. | 348/14.08 |
| 7,039,172 B2 | 5/2006 | Wrobel | |
| 2003/0025786 A1 | 2/2003 | Norsworthy | |
| 2003/0058806 A1 | 3/2003 | Meyerson et al. | |
| 2003/0215074 A1* | 11/2003 | Wrobel | 379/142.04 |

FOREIGN PATENT DOCUMENTS

| | | |
|---|---|---|
| JP | 63-43463 | 2/1988 |
| JP | 5-7263 | 1/1993 |
| JP | 6-30233 | 2/1994 |
| JP | 7-175813 | 7/1995 |
| JP | 2003-348218 | 12/2003 |

OTHER PUBLICATIONS

Combined Office Action and Search Report in ROC (Taiwan) Patent Appl. No. 095125527, dated Jan. 21, 2010.
Extended European Search Report for counterpart application EP 06014459.9, dated Mar. 26, 2009, 7-pgs.
Office Action from JPO in Patent Application No. 2006-192024, dated Apr. 28, 2009.

* cited by examiner

*Primary Examiner* — Curtis Kuntz
*Assistant Examiner* — Maria El-Zoobi
(74) *Attorney, Agent, or Firm* — Wong, Cabello, Lutsch, Rutherford & Brucculeri, LLP

(57) ABSTRACT

Disclosed herein is a system and method for storing and transmitting a videoconference system name (identifier) in the languages of double byte character sets. Although described in terms of a videoconferencing system, the techniques described herein have applicability to various other systems that rely upon inter-language compatibility, including telephonic communication such as cell phones or IP phones, as well as various computer network applications in which computers having different default languages are in communication. In a preferred embodiment, the system identifier is stored in a text or ASCII format rather than native (binary) format. Additionally, a system employing a preferred embodiment of the teachings described herein allows a particular system to have multiple site names in multiple different languages. This allows such a system to interface and exchange identifier data with other systems having different language settings during a caller ID exchange.

26 Claims, 4 Drawing Sheets

CONFERENCING SYSTEM AND METHOD FOR EXCHANGING SITE NAMES (CALLER ID) IN LANGUAGES BASED ON DOUBLE OR MULTIPLE BYTE CHARACTER SETS

CROSS-REFERENCE TO RELATED APPLICATIONS

This is a non-provisional of U.S. Provisional Application Ser. No. 60/698,693, filed 13 Jul. 2005, which is incorporated herein by reference and to which priority is claimed under 35 U.S.C. §119.

FIELD OF THE DISCLOSURE

The present invention relates generally to videoconferencing and more particularly to a system and method for exchanging site names (caller ID) in languages using non-Latin alphabets (e.g., languages based on double or multiple byte character sets).

BACKGROUND OF THE DISCLOSURE

In the videoconferencing arts, it is common for a videoconference endpoint (i.e., a videoconferencing terminal located at a particular site) to provide identifying information to another endpoint or a multipoint control unit, bridge, or gateway with which it is engaged in a videoconference. This identifying information frequently includes either a geographic location or a person's name. In many cases, these identifiers may be displayed to a user at another endpoint of a video conference to identify the video images currently being displayed as coming from a particular location or a particular person.

A problem arises when the identifiers are in languages that do not use the Latin alphabet. Historically site names in the languages of so-called double byte character sets, such as Chinese, Japanese, Korean, and Russian, have not been permitted. For example, a videoconference endpoint located in China would not be allowed to have a Chinese language site name. Instead, such a system would have only an English or Pinyin system name. As is known, Pinyin is a method for phonetically writing traditional and simplified Chinese with characters from the Latin alphabet. When such a system establishes a videoconference with another endpoint, e.g., an endpoint located in the United States using English as its language, the two endpoints exchange their site names, and the site name of each endpoint is shown on the other endpoint's display in English. This behavior is neither desirable nor convenient if a conference user does not understand English.

This behavior has heretofore been tolerated because of various technical reasons including: (i) Lack of standardization for how names in the languages of double byte character sets be stored, i.e., in native (binary) format or American Standard Code for Information Interchange (ASCII) format; and (ii) lack of standardization for how the site name string should be sent to the remote end during caller ID exchange when the endpoints are using different language settings.

Therefore, what is needed in the art is a system and method for facilitating the storage and exchange of identifiers in non-Latin, double-byte character sets.

SUMMARY OF THE DISCLOSURE

Disclosed herein is a system and method for storing and transmitting a videoconference site name (identifier) in the languages of double byte character sets. Although described in terms of a videoconferencing system, the techniques described herein have applicability to various other systems that rely upon inter-language compatibility, including telephonic communication such as cell phones or IP phones, as well as various computer network applications in which computers having different default languages are in communication. In a preferred embodiment, the site name is stored in text format rather than in a native (binary) format. As used herein, a native (binary) format is distinguished from text formats, such as American Standard Code for Information Interchange (ASCII), that store data for characters according to specific code numbers. Additionally, a system employing a preferred embodiment of the teachings described herein allows a particular system to have multiple site names in multiple different languages. This allows such a system to interface and exchange its site name data with other systems having different language settings during the caller ID exchange.

The subject matter of the present disclosure is directed to overcoming, or at least reducing the effects of, one or more of the problems set forth above.

BRIEF DESCRIPTION OF THE DRAWINGS

Preferred embodiments and other aspects of subject matter of the present disclosure will be best understood with reference to a detailed description of specific embodiments, which follows, when read in conjunction with the accompanying drawings, in which.

Figure 1A:
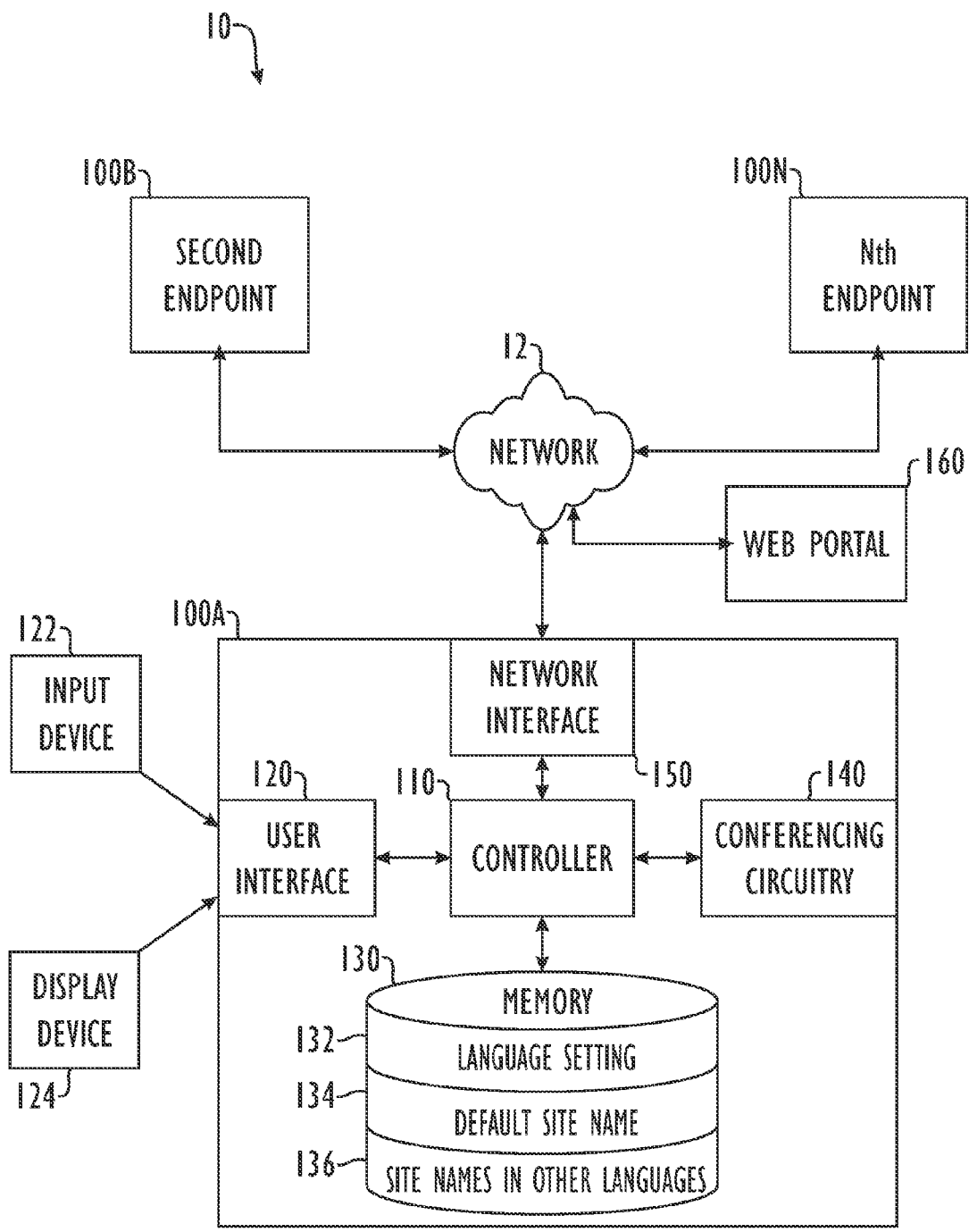
FIG. 1A illustrates an embodiment of a conferencing system in accordance with certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

FIG. 1A schematically illustrates an embodiment of a conferencing system 10 in accordance with certain teachings of the present disclosure. The conferencing system 10 includes a first endpoint 100A and one or more second endpoints 100B . . . 100N. The various endpoints 100A, 100B . . . 100N are capable of connecting in a conference via a network 12 using techniques known in the art. In one embodiment, the conferencing system 10 is a videoconferencing system so that the endpoints 100A, 100B . . . 100N are videoconferencing terminals or similar devices known in the art. It will be appreciated that the teachings of the present disclosure are applicable to other systems that rely upon inter-language compatibility, including conferencing systems and telephonic communication systems such as cell phones or IP phones, as well as various computer network applications in which computers having different default languages are in communication with one another.

In the videoconferencing system 10, the first endpoint 100A is a videoconferencing terminal located at particular site. Likewise, the other endpoints 100B . . . 100N are other videoconferencing terminals, multipoint control units, bridges, or gateways. Some of the components of the first endpoint 100A are schematically illustrated. The first endpoint 100A includes a controller 110, a user interface 120, memory 130, conference circuitry 140, and a network interface 150. Details related to these components are known in the art and not repeated herein. In addition, one skilled in the art will appreciate that the endpoint 100A includes other components not shown here for illustrative purposes.

The controller 110, user interface 120, memory 130, conference circuitry 140, and network interface 150 include hardware, firmware, software and any combination thereof. The controller 110 is configured to control operation of the first endpoint 100A. The user interface 120 is communicatively coupled to a user input device 122 to receive user inputs. The user interface 120 is communicatively coupled to a display device 124 for displaying video, menus, graphical user interface, etc. The memory 130 stores control and configuration information for the first endpoint 100A. In one embodiment, the user interface 120 may include an embedded graphical user interface having screens and menus for configuring the first endpoint 100A. Alternatively, a web portal 160 (e.g., a computer having a browser connecting to a server via the Internet) can connect to the first endpoint 100A and can use web-based GUI screens and menus to configure the first endpoint 100A.

The conferencing circuitry 140 handles conferencing for the first endpoint 100A and can include audio and video decoders and other necessary circuitry known in the art. The network interface 150 handles communications and sends and receives messages with the other endpoints 100B . . . 100N via the network 12. Accordingly, the network interface 150 uses standard protocols known in the art for communications in conferences, including those used for videoconferences.

The memory 130 stores a language setting 132 for the endpoint 100A, a default site name or identifier 134 that is composed of Latin-based characters, and a plurality of site names or identifiers 136 for the first endpoint 100A that are configured in a plurality of other languages. The language setting 132, default site name 134, and site names 136 in other languages are used to exchange caller ID information between one endpoint and another endpoint when a conference is established. In general, the default site name 134 is in Latin-based characters (i.e., in ASCII format) so that the default site name 134 will be mutually compatible with other endpoints and devices.

When the controller 110 initiates a conference call with at least one of the other endpoints (e.g., second endpoint 100B) via the network interface 150, for example, the controller 110 sends its language setting 132 to the second endpoint 100B. The controller 110 can also send its default site name 134 to the second endpoint 100B. As part of the call initiation, the controller 110 receives a language setting from the second endpoint 100B via the network interface 150.

If the language setting received from the second endpoint 100B is a Latin-based language setting, then the controller 110 does not need to perform any additional steps to handle the exchange of site names because the second endpoint 100B has already returned or will eventually return its default site name in a Latin-based language used by the first endpoint 100A. Accordingly, the controller 110 can instruct the user interface 120 to show the default site name (caller identifier or ID) of the second endpoint on the display 124 in the appropriate language for the user of the first endpoint 100A.

If the language setting received from the second endpoint 100B is not Latin-based for the first endpoint 100A, then the controller 110 accesses the memory 130 and searches for one of the stored site names having a matching language of the second endpoint's language setting. When located, the controller 110 sends the matching site name to the second endpoint via the network interface 150. In this way, the second endpoint 100B will be able to display the site name of the first endpoint 100A in the appropriate language configured for the second endpoint 100B.

In addition, by sending its language setting 132 to the second endpoint 100B, the first endpoint 100A will eventually receive the site name of the second endpoint 100B in the same language used by the first endpoint 100A. Then, the controller 110 can instruct the user interface 120 to show the site name (Caller ID) of the second endpoint 100B on the display 124 in the appropriate language for the user of the first endpoint 100A.

Figure 1B:
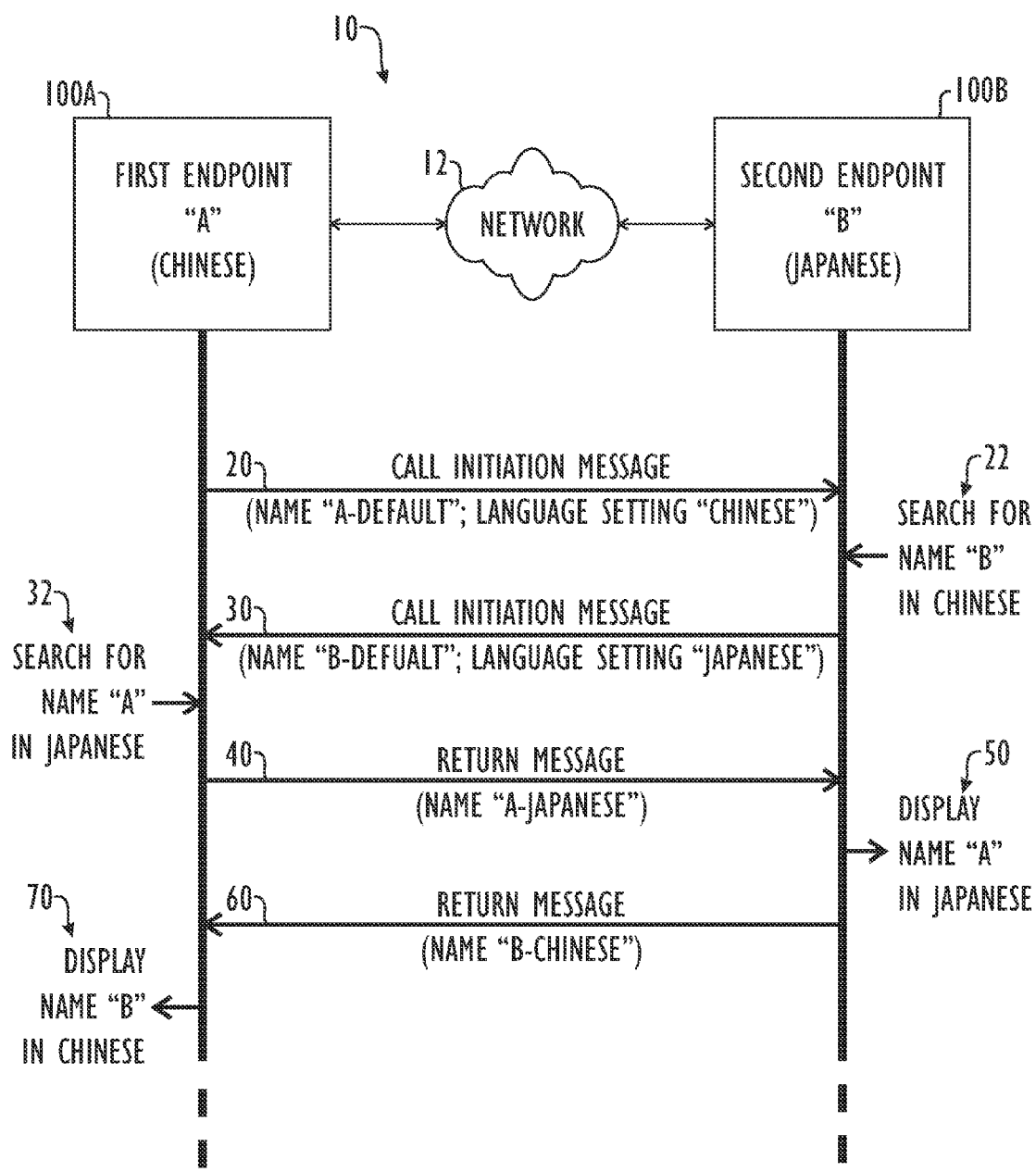
FIG. 1B illustrates two endpoints of the conferencing system exchanging double byte character system identifiers in accordance with certain teachings of the present disclosure.

Given the overview of the conferencing system 10 discussed above, we now turn to a more detailed discussion of how information is exchanged between two of the endpoints 100A and 100B. FIG. 1B illustrates the two endpoints 100A and 100B of the conferencing system 10 exchanging site names or identifiers in accordance with certain teachings of the present disclosure. In the present example, the first endpoint 100A is configured for Chinese, and the second endpoint 100B is configured for Japanese. Accordingly, the first endpoint 100A has a default site name in English/Piyin or other Latin-based language and has a language setting for Chinese. The second endpoint 100B has a default site name in English or other Latin-based language and has a language setting for Japanese. During a conference call via the network 12, the default site names or identifiers (i.e., information to identify the endpoint) of the two endpoints 100A and 100B are exchanged. Using the techniques of the present disclosure, the two endpoints 100A and 100B are capable of exchanging site names or identifiers in appropriate compatible languages if the default site names do not match the preferred language settings configured for the endpoints 100A and 100B.

As discussed previously, each endpoint 100A and 100B stores its site name in a variety of different languages, including a default language. For example, each endpoint 100A and 100B can store its site name or other identifier in languages having Latin-based alphabets, such as English, French, German, etc. The Latin-based characters can be encoded using a single-byte character set, such as American Standard Code for Information Interchange (ASCII) or ISO 8859-1, where each character is encoded by one byte. As is known in the art, ASCII is a single-byte character set that uses 7-bit encoding for English, and Latin-1 (ISO 8859-1) is single-byte character set that uses 8-bit encoding for many Western European languages.

In addition, each endpoint 100A and 100B can store its site name or other identifier in languages such as Chinese, Japanese, Korean, and Russian that do not use a Latin-based alphabet. These other languages can be encoded with character sets that are not single byte. Some of the other possible character sets include Shift_JIS, EUC-KR, UCS-2, and UTF-8. Shift_JIS is a double-byte character set that uses 16-bit encoding for Japanese. Other character sets for Japanese include EUC-JP and ISO-2022-JP. EUC-KR is a double-byte character set that uses 16-bit encoding for Korean. UCS-2 is a double-byte character set that uses two-byte Unicode encoding, and UTF-8 is a multiple byte character set that uses multi-byte Unicode encoding.

Once a site name or identifier is entered for a particular language having a non-Latin based alphabet (e.g., Chinese), the site name is preferably converted from its native string of double-byte characters to a double-byte hex code format (also referred to herein as a text or ASCII format) in which the site name is then stored in memory. In particular, the double byte characters of the binary string are represented in the text or ASCII format as \uxxxx, where xxxx contains the two hex values of the double byte character. The conversions of the native (binary) string of double byte characters to and from the double-byte hex code format are based on the Unicode encoding format and are performed using techniques well known to those skilled in the art.

When the call first connects, each endpoint 100A and 100B sends its language setting and its default site name (caller ID information) to the other endpoint 100A and 100B. The language settings exchanged are preferably based on a code, such as the ISO 639 that can represent countries or names of languages with letter codes. Once each endpoint 100A and 100B receives the far end's language setting, each endpoint 100A and 100B returns to the far end the site name or identifier (if one is available) in the language that the far end needs. Once the far end endpoint 100A and 100B receives the site name (which is transmitted with the double-byte hex code in the text or ASCII format), it converts the name from the double-byte hex code in text or ASCII format to the native (binary) string of double byte characters and then displays the name properly in the language of the receiving endpoint 100A and 100B.

For example, the endpoints 100A and 100B both have stored their respective site names in different languages. When the conference call is established between system 100A and 100B via the network 12, the first endpoint 100A sends a call initiation message at stage 20 to the second endpoint 100B. The call initiation message at stage 20 includes the default site name (e.g., Name "A" in default language of English/Pinyin) and the language setting of Chinese for the first endpoint 100A. Similarly, the second endpoint 100B sends a call initiation message at stage 30 to the first system 100A that includes its default site name (e.g., Name "B" in default language of English) and its language settings of Japanese.

Upon receiving the Chinese language setting from the first endpoint 100A at stage 20, the second endpoint 100B at stage 22 looks for its site name in Chinese and send the site name in Chinese (e.g., Name "B-Chinese") in a return message at stage 60 to the first endpoint 100A. Likewise, upon receiving the Japanese language setting from the second system 100B at stage 30, the first endpoint 100A at stage 32 looks for its site name in Japanese and sends the site name in Japanese (e.g., Name "A-Japanese") in a return message at stage 40 to the second endpoint 100B. As a result, the first endpoint 100A at stage 70 will display the site name or identifier in Chinese for the second endpoint 100B, and the second endpoint 100B at stage 50 will display the site name or identifier in Japanese for the first endpoint 100A.

As noted above, each videoconferencing system or endpoint (generally designated 100) can store its site name in languages that require double or multiple byte character sets. To store these site names, it is necessary to provide a mechanism to input the characters in the endpoint 100. A variety of input techniques are known to those skilled in the art, and thus details are not repeated here. Exemplary character input techniques will vary slightly from language to language. In a preferred form, however, the endpoint 100 presents a user with a virtual keyboard in which to enter the site names and other information. Such a virtual keyboard would have a layout corresponding to the particular language, and the virtual keyboard may be presented either through a web-based interface or an embedded interface of the endpoint 100. Ordinary physical keyboards having the appropriate layout for a given language may also be provided as a peripheral device for coupling to the endpoint 100. As an alternative, many languages have also adapted numeric keypads of the type provided for telephones for inputting characters in that language, e.g., those used with various text messaging services. Such an adapted numeric keypad may also be provided as an interface for the input of the system identifier in the desired language, either physical or in virtual form.

Figure 2:
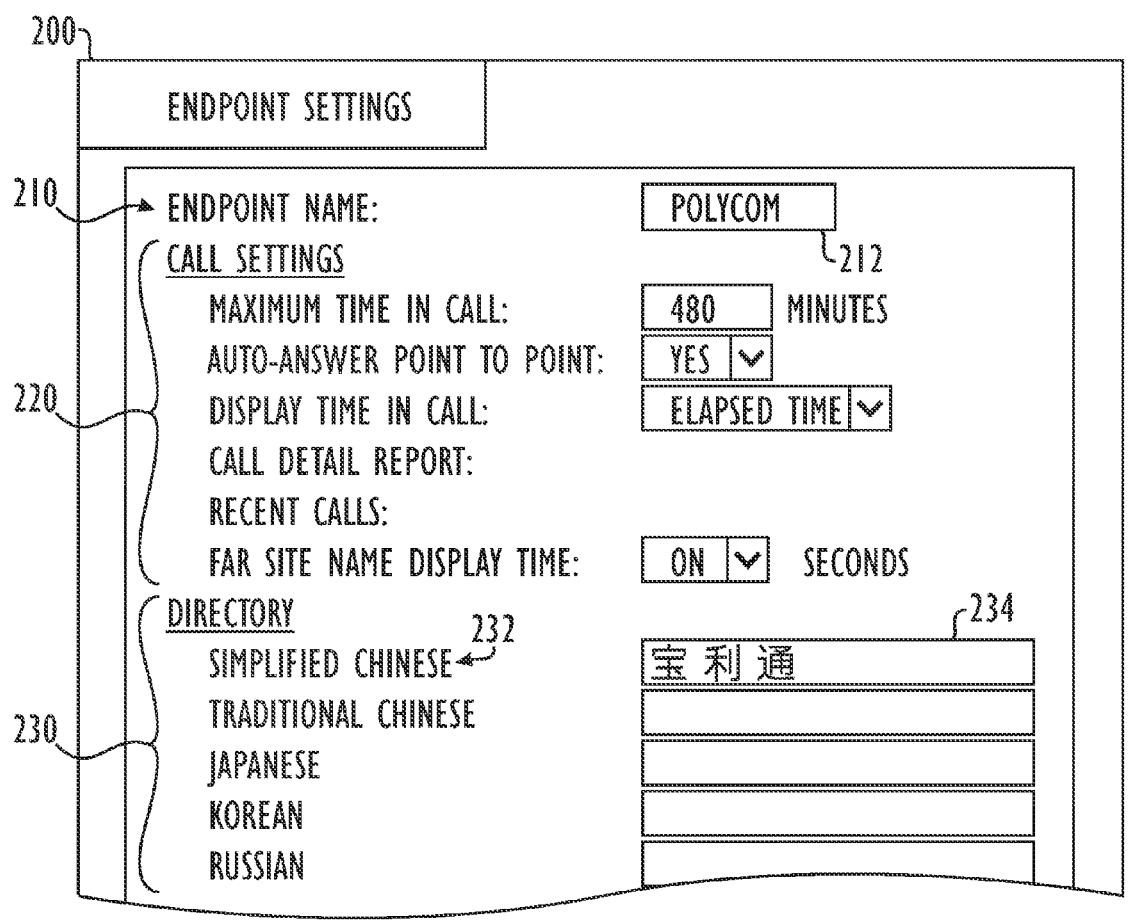
FIG. 2 illustrates a screen of a web-based graphical user interface for entering internationalized site names for a videoconferencing system.

Referring to FIG. 2, a screen 200 of a web-based graphical user interface for a videoconferencing system is illustrated. As noted previously with reference to FIG. 1A, a web portal 160 can be used to configure an endpoint according to the present disclosure. Using this web-based GUI screen 200 of FIG. 2, a user enters a default site name 210 for the system or endpoint in a field 212. The default site name 210 in field 212 is preferably entered in English/Pinyin or other Latin-based characters so it will be mutually compatible with existing endpoints and systems that may or may not be capable of handling site names or Caller ID information in other languages or in double byte characters. The default site name 210 in field 212 is the site name that is initially sent to a far-end endpoint via standard signaling (H.323 call setup, IIS strings in H.320, and so forth). In addition, the default site name 210 in field 212 appears in a recent call page of the far-end endpoint. Furthermore, the default site name 210 in field 212 is also the site name that is registered for the Global Dialing Scheme (GDS) and the videoconferencing gatekeeper. As is known in the art, the Global Dialing Scheme (GDS) is a numbering system used for videoconferencing and voice over IP networks that allows each participating videoconferencing endpoint, Multipoint Control Unit, and gateway to be given a number.

Among a number of standard customizable features 220 (e.g., call settings such as maximum call length, auto-answer, etc.), the web-based GUI screen 200 also includes a directory feature 230 for including internationalized site names for the associated videoconferencing endpoint or system in other languages. Using this directory feature 230 web-based GUI screen 200, the user can enter a plurality of site names for a videoconferencing endpoint or system in a plurality of languages. This feature 230 allows the user to enter an alternative site name in a plurality of languages. For example, the languages can include Korean, simplified Chinese, traditional Chinese, Japanese, and Russian.

For example, the directory entry 232 for the site name in Simplified Chinese includes a field 234 in which the user enters characters of the site name in simplified Chinese. As discussed previously, the near endpoint configured with this simplified Chinese site name in field 234 can establish a videoconference call with a far endpoint having simplified Chinese as its language setting. Initially, the near endpoint would send its default site name in field 212 to the far endpoint using an existing data channel, such as proprietary Polycom data channel. In turn, the far endpoint would return its language setting of simplified Chinese to the near endpoint. Once the language setting is received, the near endpoint would return the simplified Chinese site name of field 234 to the far endpoint. The sent site name of field 234 can then be displayed by the far endpoint as part of the caller ID information of the near endpoint (assuming that the proprietary data channel is supported by any intermediate devices). Preferably, transmission of the internationalized site names in fields 234 are supported in H.320, H.323, and SIP calls.

Figure 3:
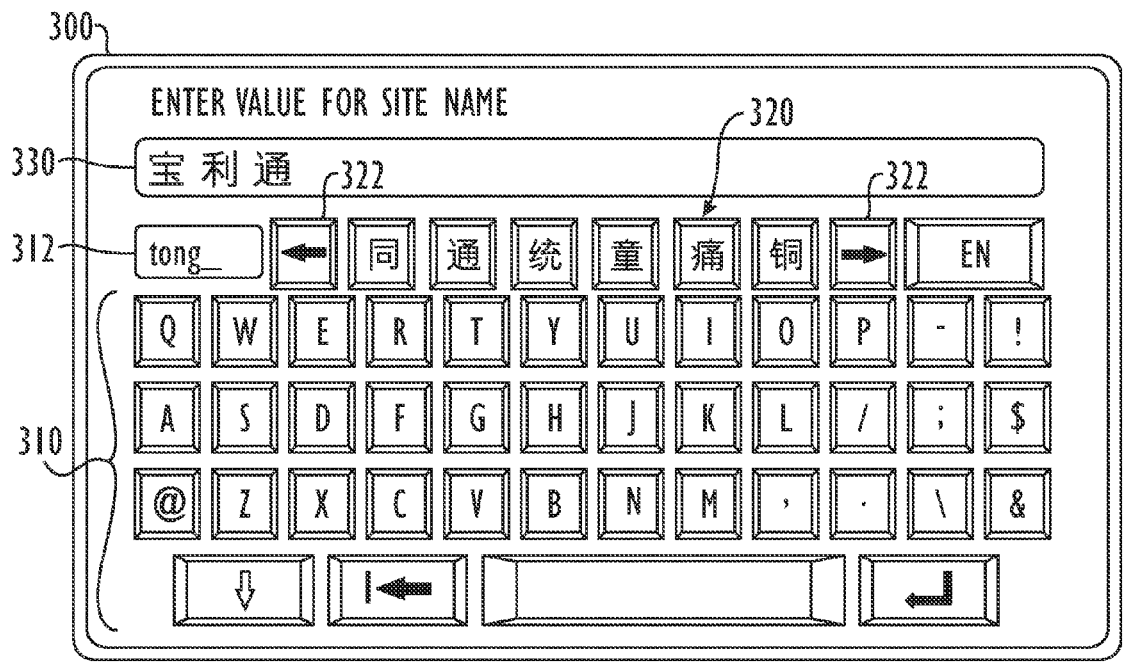
FIG. 3 illustrates a screen of an embedded graphical user interface for entering internationalized site names for a videoconferencing system.
Figure 4:
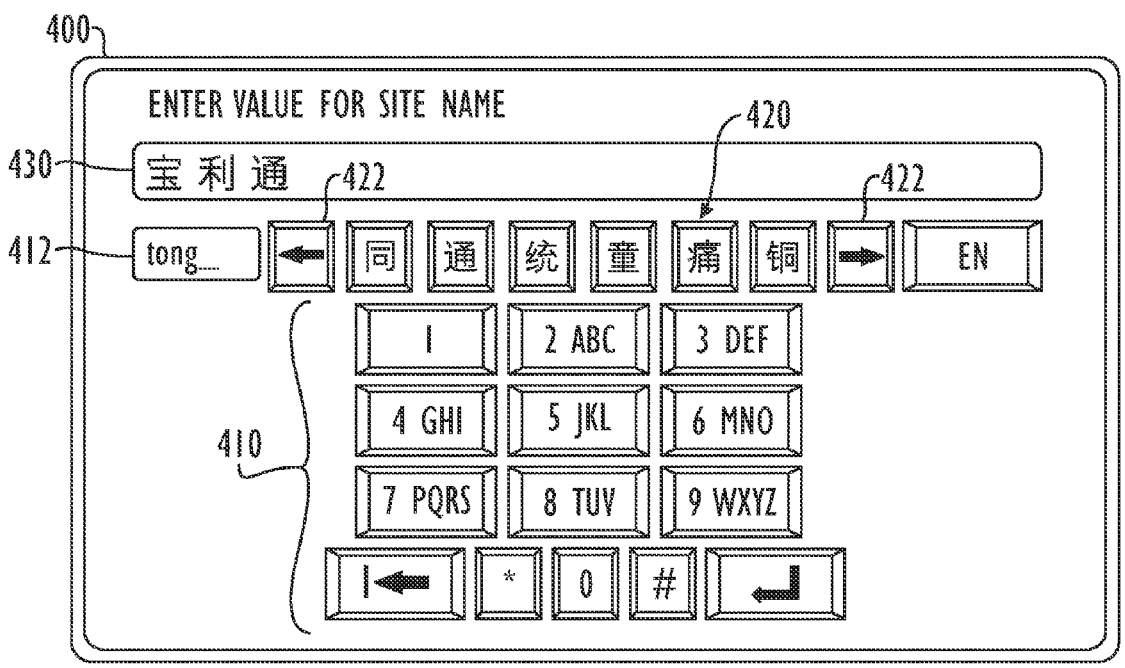
FIG. 4 illustrates another screen of an embedded graphical user interface for entering internationalized site names for a videoconferencing system.

FIGS. 3 and 4 show screens 300 and 400 of a graphical user interface that is embedded or localized in a conferencing endpoint 100. In FIGS. 3 and 4, the screens 300 and 400 are directed for a user to enter simplified Chinese for illustrative purposes only. These screens 300 and 400 can be similarly configured for other languages having double or multiple byte character sets, such as traditional Chinese, Korean, Japanese, and Russian as well as other languages.

In FIG. 3, the screen 300 includes a virtual keyboard 310 for a user to enter data and make selections. To enter the Chinese characters for the site name, the user uses an input device (e.g., a remote control) and inputs Latin-based characters on the virtual keyboard 310 to enter Pinyin for a simplified Chinese character. The Latin-based characters entered for the Pinyin are displayed in a character display 312 on the screen 300. The videoconferencing endpoint or system having the embedded screen 300 stores a Pinyin Table that contains at least some of the most frequently used Chinese characters. For example, the Pinyin Table may contain approximately 6700 of the most frequently used Chinese characters and their associated Pinyin representation. The endpoint or system having the embedded user interface can also store character sets for other languages so the videoconferencing endpoint or system having the embedded screen 300 can be used to input site names in other languages.

As the user creates the Pinyin from the keyboard 310, the user sees the possible Chinese characters for that particular Pinyin displayed on virtual keys 320 on the screen 300. The user can scroll through these possible Chinese characters on virtual keys 320 using arrow keys 322 and can select the desired Chinese character by pressing its associated key 320. The selected Chinese character is then displayed in a character display 330 where the site name is constructed. The user can then store the constructed site name in display 330 for use by the endpoint or system during videoconference calls according to the techniques disclosed herein.

In FIG. 4, the screen 400 includes a cell phone style keypad 410 for a user to enter data and make selections. To enter the Chinese characters for the site name, the user uses an input device (e.g., a remote control) and inputs Latin-based characters on the virtual keypad 410 to enter Pinyin for a simplified Chinese character. When entered, the Latin-based characters appear in a character display 412 on the screen 400. As the Pinyin is constructed in display 412, the user sees the possible Chinese characters for that particular Pinyin displayed on virtual keys 420 on the screen 400. The user can scroll through these possible Chinese characters using arrow keys 422 and can select the desired Chinese character by pressing its associated key 420. The selected Chinese character is then displayed in a character display 430 where the site name is constructed. The user can then store the constructed site name for use by the system during videoconference calls according to the techniques disclosed herein.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A first conferencing endpoint, comprising:
a user interface;
memory for storing a plurality of first site names for the first endpoint, the first site names configured in a plurality of languages;
a network interface for communicating in a conference with at least one second endpoint via a network; and
a controller coupled to the user interface, the network interface, and the memory and configured to:
connect in a conference call between the first endpoint and the at least one second endpoint via the network interface;
receive a language setting from the second endpoint via the network interface;
match the language setting from the second endpoint with the language configured for one of the first site names stored in memory; and
send the matching first site name to the at least one second endpoint via the network interface.

2. The first conferencing endpoint of claim 1, wherein the conference call comprises a videoconference call.

3. The first conferencing endpoint of claim 1, wherein to connect in the conference call, the controller is further configured to send a first language setting for the first endpoint to the second endpoint.

4. The first conferencing endpoint of claim 3, wherein the controller is further configured to receive a second site name from the at least one second endpoint that matches the first language setting of the first endpoint sent to the at least one second endpoint, and wherein the user interface displays the second site name.

5. The first conferencing endpoint of claim 4, wherein to display the second site name in the user interface of the first endpoint, the controller is configured to convert a double-byte hex code format of the second site name into a native or binary format.

6. The first conferencing endpoint of claim 1, wherein to connect in the conference call, the controller is further configured to send a default site name for the first endpoint, the default site name being based on a mutually compatible format.

7. The first conferencing endpoint of claim 6, wherein the default site name is based on American Standard Code for Information Interchange format for a Latin-based character set.

8. The first conferencing endpoint of claim 1, wherein the controller is further configured to receive a default site name for the at least one second endpoint, the default site name being based on a mutually compatible format.

9. The first conferencing endpoint of claim 8, wherein the user interface displays the default site name received from the at least one second endpoint if another site name for the at least one second endpoint is not received.

10. The first conferencing endpoint of claim 1, wherein the controller is configured to convert the first site names based on a native or binary format into a double-byte hex code format for storage in memory, whereby the matching first site name sent to the at least one second endpoint comprises the double-byte hex code format stored in memory.

11. The first conferencing endpoint of claim 1, wherein the memory stores double-byte hex code of a plurality of non-Latin-based characters for at least one of the languages, and wherein the user interface is configured to:

receive input of one or more Latin-based characters;

match the input to one or more of the non-Latin-based characters;

receive selections of one or more of the matching non-Latin-based characters; and store the double-byte hex code of the selections in memory as one of the first site names for the at least one language.

12. A first videoconferencing endpoint, comprising:

a user interface;

memory for storing a first language setting, a first default site name, and a plurality of first site names for the first endpoint, the first default site name configured in a first default language, the first site names configured in a plurality of languages;

a network interface for communicating in a conference with at least one second endpoint via a network; and a controller coupled to the user interface, the network interface, and the memory and configured to:

connect in a videoconference call between the first endpoint and the at least one second endpoint via the network interface;

send the first language setting and the first default site name for the first endpoint to the at least one second endpoint; and wait to receive a second language setting and a second default site name from the at least one second endpoint via the network interface, the second default site name based on a format for a Latin-based character set, wherein if the second language setting is received, the controller is further configured to— search the memory for one of the first site names configured in the language matching the second language setting, and send the matching first site name if found in the search to the at least one second endpoint via the network interface.

13. The first conferencing endpoint of claim 12, wherein the controller is configured to wait to receive a second site name from the at least one second endpoint configured in the language matching the first language setting, and wherein the user interface displays the default site name for the at least one second endpoint if the second site name is not received or displays the second site name in the user interface of the first endpoint if the second site name is received.

14. The first conferencing endpoint of claim 12, wherein the memory stores double-byte hex code of a plurality of non-Latin-based characters for at least one of the languages, and wherein the user interface is configured to:

receive input of one or more Latin-based characters;

match the input to one or more of the non-Latin-based characters;

receive selections of one or more of the matching non-Latin-based characters; and store the double-byte hex code of the selections in memory as one of the first site names for the at least one language.

15. A conferencing system, comprising:

means for configuring a plurality of first site names for a first endpoint in a plurality of languages;

means for configuring a plurality of second site names for at least one second endpoint in a plurality of languages;

means for exchanging first and second language settings between the first endpoint and the at least one second endpoints connected in a conference call;

means for sending the first site name from the first endpoint to the at least one second endpoint, the first site name being configured in the language that matches the second language setting for the at least one second endpoint; and means for sending the second site name from the at least one second endpoint to the first endpoint, the second site name being configured in the language that matches the first language setting for the first endpoint.

16. The first conferencing endpoint of claim 15, further comprising means for exchanging first and second default site names between the first endpoint and the at least one second endpoints connected in the conference call, the first and second default site names being configured in a mutually compatible format.

17. A conferencing method for a first endpoint, comprising:

storing a plurality of first site names for the first endpoint in memory, the first site names configured in a plurality of languages;

connecting in a conference call between the first endpoint and at least one second endpoint;

receiving a language setting from the at least one second endpoint;

obtaining the first site name for the first endpoint that is configured for the language that matches the language setting from the at least one second endpoint; and sending the matching first site name to the at least one second endpoint.

18. The method of claim 17, wherein the conference call comprises a videoconference call.

19. The method of claim 17, wherein connecting in the conference call further comprises sending a language setting for the first endpoint to the at least one second endpoint.

20. The method of claim 19, further comprising:

receiving a second site name from the at least one second endpoint that matches the language setting of the first endpoint sent to the at least one second endpoint; and displaying the second site name with the first endpoint.

21. The method of claim 20, wherein displaying the second site name with the first endpoint comprises converting a double-byte hex code format of the second site name into a native or binary format.

22. The method of claim 17, further comprising receiving a default site name for the at least one second endpoint, the default site name being based on a mutually compatible format.

23. The method of claim 22, further comprising:

sending a language setting for the first endpoint to the at least one second endpoint;

waiting to receive a second site name from the at least one second endpoint in a language corresponding to the language setting sent;

displaying the default site name for the at least one second endpoint with the first endpoint if the second site name is not received; and displaying the second site name with the first endpoint if received.

24. The method of claim 17, wherein the act of obtaining the first site name for the first endpoint that matches the second language setting for the second endpoint comprises:

searching the plurality of languages for the first site names stored in memory for the one language that matches the second language setting of the at least one second endpoint; and accessing the first site name in memory having the matching language.

25. The method of claim 17, wherein storing the plurality of first site names for the first endpoint in memory comprises converting one or more of the first site names based on a native or binary format into a double-byte hex code format for storage in memory, whereby sending the matching first site name to the at least one second endpoint comprises sending the double-byte hex code format for the matching first site name stored in memory.

26. The method of claim 17, wherein storing the plurality of first site names for the first endpoint in memory comprises:
   storing double-byte hex code of a plurality of non-Latin-based characters for at least one of the languages;
   receiving input of one or more Latin-based characters;
   matching the input to one or more of the non-Latin-based characters;
   receiving selections of one or more of the matching non-Latin-based characters; and
   storing the double-byte hex code of the selections in memory as one of the first site names for the at least one language.

* * * * *